(12) United States Patent
Loupia

(10) Patent No.: US 8,234,406 B2
(45) Date of Patent: Jul. 31, 2012

(54) METHOD OF REDIRECTING CLIENT REQUESTS TO WEB SERVICES

(75) Inventor: David Loupia, Carros (FR)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 10/596,232

(22) PCT Filed: Nov. 10, 2004

(86) PCT No.: PCT/EP2004/052911
§ 371 (c)(1), (2), (4) Date: Jun. 5, 2006

(87) PCT Pub. No.: WO2005/060203
PCT Pub. Date: Jun. 30, 2005

(65) Prior Publication Data
US 2009/0019106 A1     Jan. 15, 2009

(30) Foreign Application Priority Data
Dec. 10, 2003   (EP) ...................................... 03368111

(51) Int. Cl.
   *G06F 15/16* (2006.01)
(52) U.S. Cl. ......................................... 709/245; 709/203
(58) Field of Classification Search .................. 709/203, 709/245
   See application file for complete search history.

(56) References Cited

U.S. PATENT DOCUMENTS

| | | | |
|---|---|---|---|
| 5,805,803 A * | 9/1998 | Birrell et al. ..................... | 726/12 |
| 6,996,622 B2 | 2/2006 | Itoh | |
| 7,454,421 B2 | 11/2008 | Imaeda et al. | |
| 7,496,658 B2 * | 2/2009 | Southam et al. .............. | 709/224 |
| 2002/0042823 A1 * | 4/2002 | DeBettencourt et al. ..... | 709/224 |

(Continued)

FOREIGN PATENT DOCUMENTS

GB     2333617 A     7/1999

(Continued)

OTHER PUBLICATIONS

PCT, "Notification of Transmittal of the International Search Report and the Written Opinion of the International Searching Authority, or the Declaration", Date of Mailing Jan. 27, 2005, International Application No. PCT/EP2004/052911, International Filing Date Nov. 10, 2004.

(Continued)

*Primary Examiner* — Jason Recek
(74) *Attorney, Agent, or Firm* — Hoffman Warnick LLC; Andrea Bauer

(57) ABSTRACT

Method of redirecting a request for a web service in a data transmission network wherein, in response to a request forwarded by a host of a client to a web service provider, the web service provider provides a Web Service Definition Language (WSDL) file based upon a message exchange protocol such as Simple Object Access Protocol (SOAP) on a transport protocol such as HTTP. This method includes the steps of forwarding a first request from the client to an old address of said web service, responding to the client from the web service point associated with the old address by sending back a message with a header, wherein the header using said message exchange protocol contains a redirection to a new address of the requested web service, and forwarding a second request from the client to the new address of the web service.

6 Claims, 3 Drawing Sheets

U.S. PATENT DOCUMENTS

| | | | |
|---|---|---|---|
| 2002/0178244 A1 | 11/2002 | Brittenham et al. | |
| 2002/0178254 A1* | 11/2002 | Brittenham et al. | 709/224 |
| 2003/0135584 A1* | 7/2003 | Roberts et al. | 709/218 |
| 2004/0128622 A1* | 7/2004 | Mountain et al. | 715/530 |
| 2004/0133656 A1* | 7/2004 | Butterworth et al. | 709/219 |
| 2004/0139154 A1* | 7/2004 | Schwarze | 709/203 |
| 2004/0194011 A1* | 9/2004 | Matsumura | 715/500 |
| 2005/0015491 A1* | 1/2005 | Koeppel | 709/226 |
| 2005/0021663 A1* | 1/2005 | Knauerhase et al. | 709/217 |
| 2005/0050228 A1* | 3/2005 | Perham et al. | 709/246 |
| 2005/0071419 A1* | 3/2005 | Lewontin | 709/201 |
| 2005/0160153 A1* | 7/2005 | Knutson et al. | 709/217 |
| 2005/0198188 A1* | 9/2005 | Hickman | 709/217 |
| 2006/0020575 A1* | 1/2006 | Snapp et al. | 707/2 |
| 2006/0047832 A1* | 3/2006 | Betts et al. | 709/229 |

FOREIGN PATENT DOCUMENTS

| | | | |
|---|---|---|---|
| JP | 2000330957 A | 11/2000 | |
| JP | 2003209570 A | 7/2003 | |
| WO | 02095605 A1 | 11/2002 | |

OTHER PUBLICATIONS

Mourad, A. et al., "Scalable Web Server Architectures," Computers and Communications, 1997. Proceedings., Second IEEE Symposium on Alexandria, Egypt, Jul. 1-3, 1997, Los Alamitos, CA, pp. 12-16.

Hansen, R. P. et al., "Web Services: An Architectural Overview," First Seminar on Advanced Research in Electronic Business, 'Online!, http://www.inf.unisinos.br/{webcomposej/Artigos/webservices. pdf, Nov. 7, 2002, pp. 1-14.

"Information Materials for IDS", Japanese Office Action Dated Jun. 22, 2010, 2 pages.

IBM, "Information Materials for IDS", JPO, Office Action Dated Dec. 21, 2010, 1 page.

* cited by examiner

METHOD OF REDIRECTING CLIENT REQUESTS TO WEB SERVICES

TECHNICAL FIELD

The invention relates to the web services provided to the clients of the Internet network and in particular relates to a method of redirecting the client requests to the web service when its address has changed.

BACKGROUND

It is a common knowledge that it is possible to have access to more and more services on the Internet network. So the Internet users are interested in obtaining information about on-line services on the Internet and how to request these services. The on-line services are generally provided by application service providers, but there are also services which are domain-oriented like the request on life sciences.

Today, it is possible for a client to obtain a requested information by using the "Web Services" which is a specific business functionality exposed by a company, usually through an Internet connection, for the purpose of providing a way for a client, a company or a program to use the service. Web services are becoming a backbone for the electronic commerce and the exchange with the application service providers.

A service provider providing public web services on the Internet network has to describe the whole informations regarding the web service. To do that, he can provide a Web Service Definition Language (WSDL) file associated with the web service. A WSDL is useful to describe the interface (methods, parameters, . . . ) and the runtime (bindings, addresses, . . . ) of the service. From the client point of view, a WSDL file contains all the information required to build the client structure. Normally, a client would use the WSDL file only at the build time and not at the run time.

In a normal production model, it is sure that a WSDL will evolve because of new functional or runtime requirements. The main difficulty when a service provider wants to update a web service and the associated WSDL file is the notification of all the web service clients. In fact, in case of a public web service, the service provider does not know the web service clients, and therefore, he cannot notify them of a change.

Some practices regarding changes in the interface of a web service are provided. Thus, a change in the interface should be always compatible with previous versions. For instance, new methods are allowed in a WSDL file, but the removal of these methods is forbidden.

However, there is no way for a service provider to notify all web service clients when the end point address of one of its public web service changes. The reasons are that he does not use a reverse proxy or a web service gateway and wants to move the web service from a first host to another more powerful host, or he wants to add a load-balancing solution in front of the web service, or he wants to add a web service gateway, a secure proxy in front of it, or he has to change the domain name.

An existing solution already exists for the HTTP protocol as transport protocol using 3xx HTTP status codes. A client browser receiving a 3xx HTTP response code knows that the location of the required document has changed and the browser automatically generates a new HTTP request to the location indicated in the 3xx HTTP response code. But this solution cannot be applied for web services using Single Object Access Protocol (SOAP) as message exchange protocol for two reasons. Firstly, the codes 3xx are not automatically handled by runtimes that provide the binding between SOAP and HTTP. Secondly, the communication protocol for the SOAP messages is not only HTTP since the SOAP messages can also be sent on other transport protocols like SMTP, JMS, . . . and the 3xx HTTP status codes for redirection are not available on these protocols.

SUMMARY OF THE INVENTION

Accordingly, the object of the invention is to achieve a method of redirecting a client of a web service to a new end point address in case of a runtime change.

The invention therefore relates to a method of redirecting a request for a web service in a data transmission network such a the Internet wherein, in response to a request forwarded by a host of a client to a web service provider, this one provides a Web Service Definition Language (WSDL) file based upon a message exchange protocol such as Simple Object Access Protocol (SOAP) on a transport protocol such as HTTP. This method comprises the steps of forwarding a first request from the client to an old address of the web service, responding to the client from the web service point associated with the old address by sending back a message wherein the header using the message exchange protocol contains the new address redirection of the requested web service, and forwarding a second request from the client to the new address of the web service.

According to another aspect, the invention relates to a system comprising a checker in the SOAP runtime of the service provider being adapted to check whether a request forwarded from the SOAP runtime of a client to the service provider has to be redirected to a new point address and to provide the new point address to which the request must be forwarded, this new point address being provided in a SOAP response message forwarded from the service provider at the old point address to the SOAP runtime of the client, and a checker in the SOAP runtime of the client adapted to check whether the SOAP response message contains the new point address and regenerate the same request and to forward it to the new point address.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
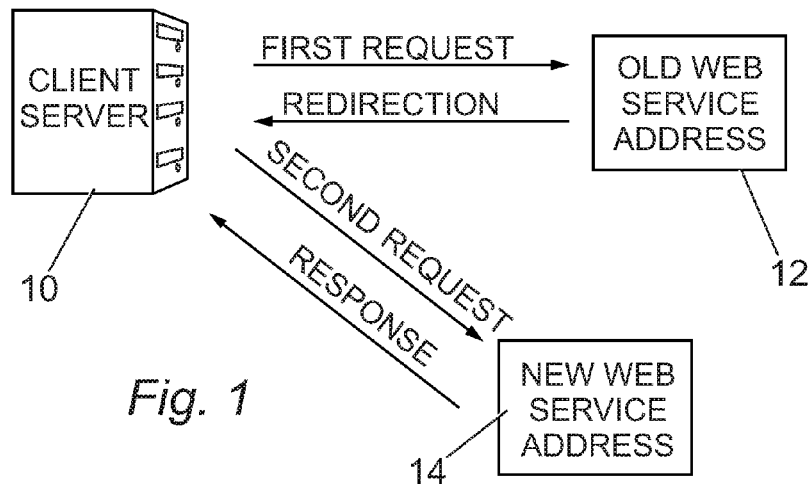
FIG. 1 is a schematic diagram representing the method according to the invention.

In reference to FIG. 1, it is assumed that a web service client 10 based upon the message exchange protocol SOAP wants to have access to web services provided by a service provider. In such a case, a first request is forwarded from the host 10 to the current web service address which is the old address point 12 since the user does not know that the address of the web service has been changed. The old point address 12 answers back to the host 10 by providing the redirection in the header of the response message as described later. Using the redirection contained in the SOAP message received from the old point address, the host 10 can then transmit a second request to the new web service address 14 in order to get a response to this request. Note that the host can be programmed to log the redirection in order to make further SOAP requests directly to the new point address.

Figure 2:
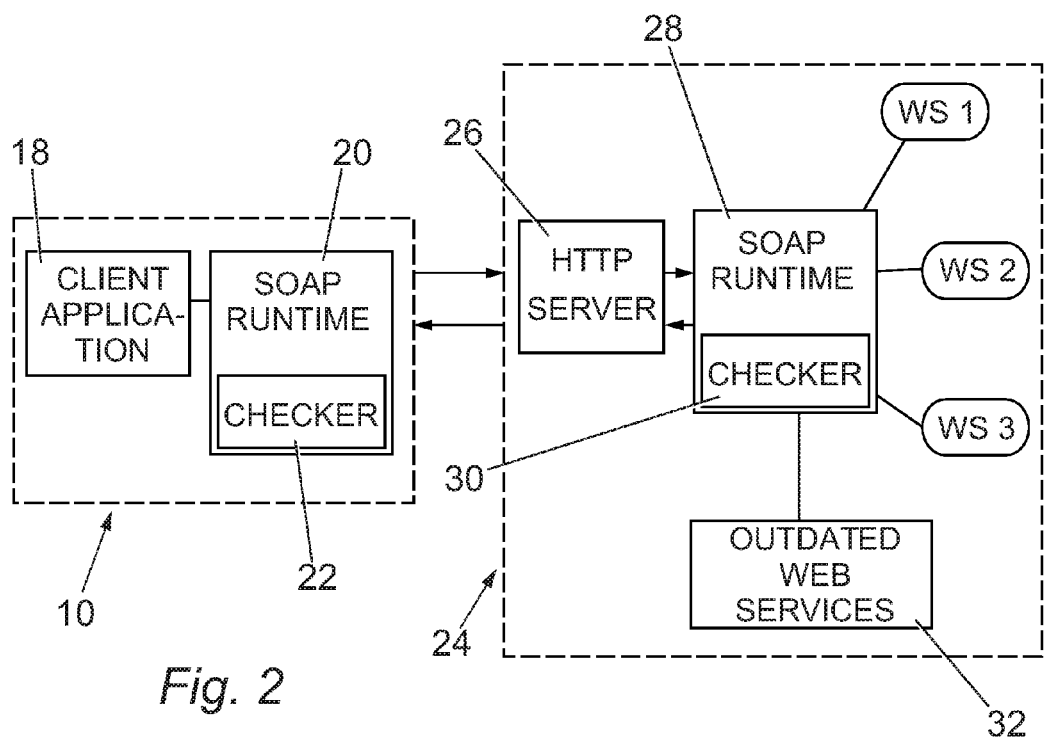
FIG. 2 is a block-diagram representing the system according to the invention.

An implementation of the method according to the invention is illustrated in FIG. 2. The web service client station 10 includes normally two functionalities: a client application 18 and a SOAP runtime contains a checker 22 which is a component in charge of checking whether a received SOAP message contains a redirection in its header. If so, the checker regenerates the same SOAP request to the new point address provided in the header as mentioned above and optionally logs the redirection to allow code changes in the client application in order to direct the future requests to the right address. Note that the checker 22 is generally a routine within the runtime, but could be an independent component accessed by the client runtime each time it receives a SOAP message.

The web service provider 24 includes a first HTTP 26 server as usual and a SOAP runtime like the client one. The runtime is adapted to gain access to the web service such as web services WS 1, WS 2 and WS 3. As for the client, the SOAP runtime 28 of the service provider has at its disposal a checker 30 which can be a software part within the runtime or an independent component accessed when a SOAP request is received. Note that any other transport protocol than HTTP could be used such as SMTP. In the latter case, the server 26 would be a SMTP server.

Each time a SOAP request is received from a client 10, the checker 30 is adapted to check whether the address of the requested web service is the right address or an old address because the web service has moved to another machine or address and has become outdated. For this, the checker 30 has access to a component 32 knowing which are the web services that have been outdated and the new address if the requested service is outdated. Then, the checker is adapted to provide the new address to the runtime in order to have it included in the header of the SOAP message returned to the client.

The way to include the new address in the header of the SOAP message is to create a SOAP header tag that has the name "Redirect" and is included in the SOAP specification to ensure that all SOAP runtimes used by the clients and service providers will understand it. Nevertheless, the inclusion of the header in the SOAP specification is not mandatory. It could be a SOAP extension supported only by several runtimes which would provide a higher quality of service clients and service providers using these runtimes.

An example of such a header in a SOAP response message could be the following XML code:

```
<soapenv:Header>
    <soapenv:Redirect soapenv:mustUnderstand="1">
    Http://newhost.domain.com/services/PublicWebService</soapenv:
    Redirect>
</soapenv:Header>
```

Figure 3:
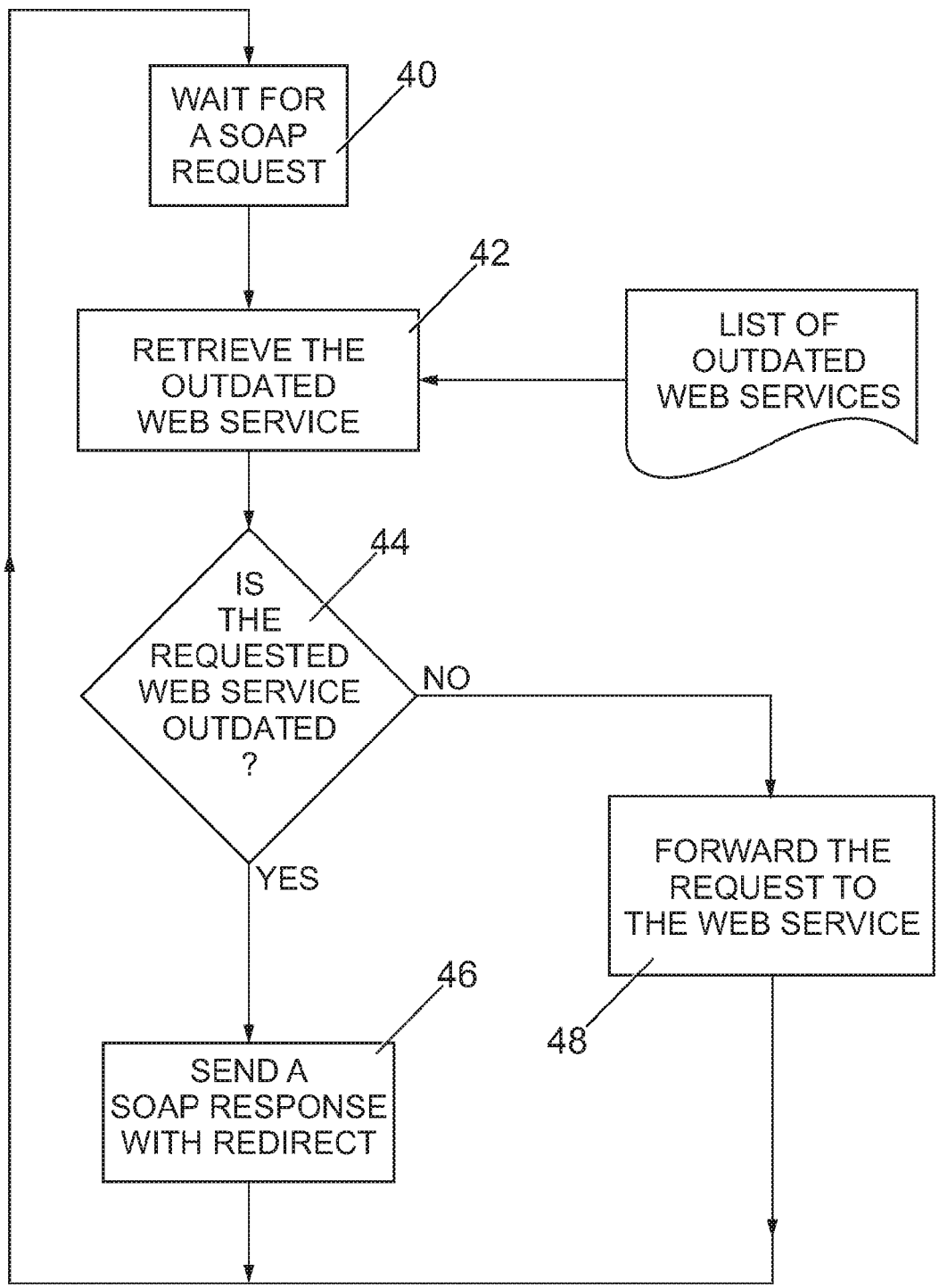
FIG. 3 is a flow chart representing the steps of the method which is implemented in the SOAP runtime associated with the old web service address.

The behavior of the server SOAP runtime server which provides the web services is illustrated in FIG. 3. At the beginning, the SOAP runtime waits for a SOAP request (step 40). As already mentioned, the SOAP runtime has access to properties file, generally written in XML, that provides the list of the outdated web services. A new point address is associated with each of said outdated web services. Therefore, after getting a SOAP request, the checker retrieves the outdated web service in this list (step 42) and checks whether the web service requested by the client is a outdated web service (step 44). If the web service is present in this list of outdated web services, the SOAP runtime does not try to contact the web service but sends back a SOAP response with the SOAP redirection header (step 46). As already explained, this header contains the new point address provided by the properties file. The SOAP body is filled with the exact SOAP body received from the client in order to allow the client SOAP runtime running again the same SOAP request to the new point address.

If the web service is not present in the list of outdated web services, the SOAP runtime continues its normal work, that is forwarding the SOAP request to the appropriate web service (step 48). In any case, the process is looped back to the starting step of waiting for a SOAP request (step 40).

Figure 4:
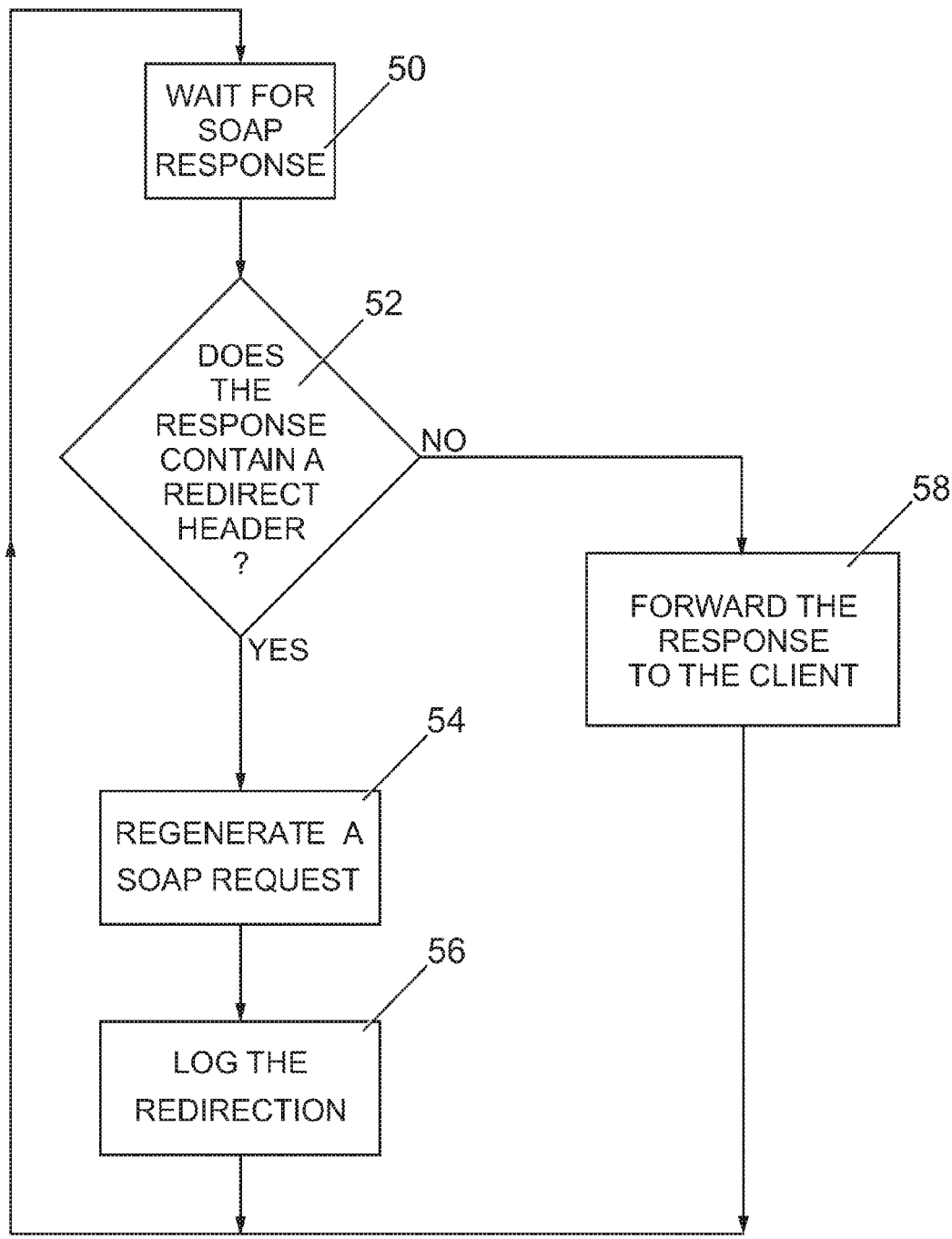
FIG. 4 is a flow chart representing the steps of the method which is implemented in the SOAP runtime of the client.

The behavior of the client SOAP runtime is illustrated in FIG. 4. At the beginning, the runtime waits for a SOAP response (step 50). Then the checker of the runtime checks whether this response contains a redirection header (step 52). If so, the SOAP runtime regenerates a new SOAP request to the new point address contained in the message header (step 54). The SOAP runtime also gets the SOAP body from the SOAP response and puts it in the new SOAP request. Optionally, the SOAP runtime can also log the redirection to allow further changes in the client code and therefore direct access to the new address without the need of requesting the redirection (step 56). If there is no redirection header in the SOAP response message, the SOAP runtime continues its normal work, that is forwarding the SOAP response to the client (step 58). In any case, the process is looped back to the starting step of waiting for a SOAP response (step 50).

Even though the Single Object Access Protocol (SOAP) is used in the preferred embodiment of the invention, it must be noted that any other message exchange protocol than SOAP could be used whatever the transport protocol being used.

The invention claimed is:

1. A method of redirecting a request for a web service in a data transmission network wherein, in response to a request forwarded by a host of a client server to a web service provider, the web service provider provides a Web Service Definition Language (WSDL) file based upon a message exchange protocol on a transport protocol;

said method comprising:
   forwarding a first request from the client server to an address of said web service,
   determining the address of the web service is an old address by checking a list of outdated web services, wherein each web service in the list is associated with the old address and a new address;
   responding to the client server from a web service point associated with said old address by sending back a message with a header, wherein the header using said message exchange protocol contains a redirection to the new address associated with the requested web service,
   checking, using a checker on the client server, for the redirection in the header of the message, wherein the redirection includes a redirection command that is included in a specification of the message exchange protocol; and
   forwarding a second request from the client server to the new address of the requested web service.

2. The method according to claim 1, wherein said new address of the requested web service is logged by said host to allow code changes in the client in order to direct future requests to the new address.

3. The method according to claim 2, wherein said message exchange protocol is Simple Object Access Protocol (SOAP) and said redirection is a SOAP header tag.

4. The method according to claim 1, wherein the transport protocol comprises Hyper Text Transfer Protocol (HTTP).

5. A system for redirecting a request for a web service in a data transmission network wherein, in response to a request forwarded by a host of a client server to a web service provider, the web service provider provides a Web Service Definition Language (WSDL) file based upon a Simple Object Access Protocol (SOAP) on a transport protocol;

said system comprising:

a web service provider including a Hypertext Transfer Protocol (HTTP) server and a SOAP runtime, the SOAP runtime including a checker; and a client server on a physical computing device, the client server including a client application and a SOAP runtime, the SOAP runtime including a checker;

wherein the checker of the web service provider is adapted to check whether a request forwarded from the SOAP runtime of the client server over the data transmission network to said service provider has to be redirected to the requested web service including a new point address by checking a list of outdated web services, wherein each web service in the list is associated with an old point address and the new point address, and to provide the new point address to which the request must be forwarded, said new point address being provided in a header of a SOAP response message forwarded from said service provider at the old point address to said SOAP runtime of the client server, the header containing a redirection of the new point address associated with the requested web service, and wherein the checker of the client server is adapted to check whether said SOAP response message contains the new point address by checking for the redirection in the header of the SOAP response message, wherein the redirection includes a redirection command that is included in a specification of the SOAP, and regenerate the same request and to forward the request over the data transmission network to said new point address.

6. The system according to claim 5, wherein the transport protocol comprises Hyper Text Transfer Protocol (HTTP).

* * * * *